United States Patent [19]

Bruner et al.

[11] B 3,989,790

[45] Nov. 2, 1976

[54] METHOD FOR PREPARING SILICONE RUBBER MOLDS

[75] Inventors: Leonard Bretz Bruner, Manchester, Mich.; Kenneth Elmon Koch, Jr., Chelmsford, Mass.

[73] Assignee: SWS Silicones Corporation, Adrian, Mich.

[22] Filed: Mar. 22, 1974

[21] Appl. No.: 453,759

[44] Published under the second Trial Voluntary Protest Program on January 27, 1976 as document No. B 453,759.

[52] U.S. Cl. .......................... 264/225; 260/37 SB; 264/220; 264/255; 264/313; 264/337

[51] Int. Cl.² ........................................ B29C 1/02

[58] Field of Search ........... 264/225, 220, 337, 338, 264/331, 313, 255, 257, 226, 227, 219; 260/37 SB

[56] References Cited
UNITED STATES PATENTS

| | | | |
|---|---|---|---|
| 3,190,947 | 6/1965 | Norcross | 264/225 |
| 3,222,443 | 12/1965 | Dames, Jr. et al. | 264/337 |
| 3,303,246 | 2/1967 | Forrest | 264/225 |
| 3,504,079 | 3/1970 | Hall | 264/225 |
| 3,792,147 | 2/1974 | Wohlfarth et al. | 264/225 |
| 3,825,618 | 7/1974 | Pepe | 260/37 SB |

OTHER PUBLICATIONS

"Flexible Urethane Molds for the Furniture Industry," SPE Journal, June 1969, vol. 25, pp. 53–55.

Primary Examiner—Jeffery R. Thurlow

[57] ABSTRACT

A silicone rubber mold is prepared by applying a room temperature curable, dough-like silicone composition to an area of a pattern which is vulnerable to high stress and thereafter the remainder of the pattern is coated with a flowable silicone composition which is curable at room temperature. The mold is cured and ultimately separated from the pattern being copied. The resulting silicone rubber molds may be used for high frequency flow molding.

11 Claims, No Drawings

METHOD FOR PREPARING SILICONE RUBBER MOLDS

The present invention relates to silicone rubber molds and particularly to a method for preparing silicone rubber molds for high frequency flow molding.

In recent years there has been considerable interest in preparing synthetic materials which simulate the appearance of natural fabrics and other textured surfaces. Various types of molds and numerous methods have been proposed heretofore, but most of these proposals have not been practical or successful in terms of large scale commercial operations. One of the most serious disadvantages of the molds prepared heretofore resides in the unavailability of molds having molding surfaces which are substantially exact negatives of the pattern being copied. In the absence of such molds, the final products always differ somewhat from the natural materials being simulated. It is not surprising therefore, to find that the known mold making procedures have involved elaborate and painstaking techniques.

Heretofore, low viscosity room temperature vulcanizable organopolysiloxane compositions have been used in mold making; however, these low viscosity organopolysiloxanes flow under and into delicate areas of a pattern and remain in these areas after demolding. By the second or third pour, the pattern is so full of silicone rubber that the details are either poor or the pattern has been completely destroyed.

Many of the molds prepared heretofore from low viscosity room temperature vulcanizable organopolysiloxane compositions do not have sufficient strength to withstand repeated use where high temperature and pressure is utilized in the molding process. For example, in a shoe mold a perforation in the pattern will result in a "pin" in the silicone rubber mold. These pins tend to break off during demolding because the silicone penetrates into the perforations and adheres thereto. Also these pins are often damaged during use because the organopolysiloxanes used heretofore did not have sufficient strength to withstand repeated physical stress. The high strength dough-like material used in this invention has the tenacity to withstand the physical abuse which molds are subjected to in a flow molding process.

Therefore it is an object of this invention to provide a flexible, elastic mold having a molding surface with exquisite detail. Still another object of this invention is to provide a mold adapted for molding thermoplastic materials. A further object of this invention is to provide molds for flow molding vinyl materials. Still a further object of this invention is to provide a mold which is resistant to tearing and exhibits dimensional stability.

The foregoing objects and others which will become apparent in the following description are accomplished in accordance with this invention, generally speaking, by providing a method for preparing silicone rubber molds whose surfaces are substantially the exact negatives of the pattern being copied.

The basic mold-making method of this invention comprises positioning the pattern being copied flat on a horizontal surface, applying a dough-like curable silicone composition to those portions of a pattern which are potential high stress areas for both the pattern and the mold, e.g., perforated, pinked and stitched areas on a shoe pattern and then applying a flowable curable silicone composition to cover the dough-like silicone composition and the remainder of the pattern. After the composite mold has fully cured and/or set, it is separated from the pattern.

More specifically, the invention relates to the use of a dough-like, room temperature curable silicone composition in combination with a flowable, room temperature curable silicone composition to form a mold which may be used for high frequency flow molding of vinyl materials.

The dough-like silicone composition of this invention contains high viscosity organopolysiloxane polymers having functional groups, most of which are linked to the terminal silicon atoms and sufficient filler to provide a 5 minute Williams plasticity value of from 60 to about 140, a cross-linking agent and a condensation catalyst.

The organopolysiloxane polymers are preferably hydroxyl-terminated organopolysiloxane polymers having repeating units of the general formula

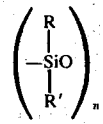

in which R and R' are organic radicals having up to about 18 carbon atoms. Examples of suitable organic radicals are monovalent hydrocarbon radicals selected from the class consisting of alkyl radicals (e.g., methyl, ethyl, propyl, butyl, hexyl, decyl, dodecyl and octadecyl radicals); aryl radicals (e.g., phenyl, diphenyl and naphthlyl radicals); alkaryl radicals (e.g., tolyl, xylyl, ethylphenyl, etc.); aralkyl radicals (e.g., benzyl, phenylethyl, etc.); halogenated monovalent hydrocarbon radicals (e.g., chlorophenyl, tetrachlorophenyl, difluorophenyl, etc.); alkenyl radicals (e.g., vinyl, allyl, etc.) and cyanoalkyl radicals and n is a number of at least 100,000.

The organopolysiloxane polymers are predominantly difunctional, but they may contain a small amount of monofunctional organopolysiloxanes. The total functionality may range from about 1.9 to about 2.1 and more preferably about 2.0.

These hydroxyl-terminated organopolysiloxane polymers may be prepared by heating cyclic organopolysiloxanes at temperatures of from about 125° to 150°C. with a small amount of a siloxane rearrangement catalyst such as potassium hydroxide, tetrabutyl phosphonium hydroxide, phosphonium chloronitride and the like. The temperature and time of heating will vary depending upon such factors as the type of organopolysiloxane employed, the siloxane rearrangement catalysts used, the concentration of the catalyst and the viscosity desired. Certain siloxane rearrangement catalysts effect the desired polymerization of the organopolysiloxane more rapidly and at lower temperatures than others. In general, the polymerization is carried out for a time sufficient to provide a high molecular weight product of from about 100,000 to 3,000,000 centipoises at 25°C., or a 30 second Williams plasticity value of from about 100 to about 180.

A sufficient amount of filler is mixed with the high viscosity organopolysiloxane polymer to provide a dough-like material having a 5 minute Williams plasticity value of from about 60 to about 140, preferably from about 90 to about 110.

The flowable silicone compositions employed herein are based primarily on organopolysiloxane polymers which have functional groups, most of which are linked to the terminal silicon atoms. These organopolysiloxane polymers are preferably hydroxyl-terminated organopolysiloxanes having repeating units of the general formula

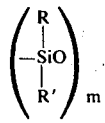

in which R and R' are the same as those described above and m is a number of at least 10.

Although these polymers are predominantly difunctional, they may contain a small amount of monofunctional organopolysiloxanes. The total functionality may range from about 1.9 to 2.1 and more preferably about 2.0. The viscosity of these polymers can vary from about 100 cs. up to about 40,000 cs., preferably from about 1000 to 20,000 and more preferably from about 2,000 cs. to about 10,000 cs. at 25°C.

Examples of suitable organopolysiloxane polymers and copolymers which may be used in the silicone compositions are hydroxyl-terminated siloxane fluids such as dimethyl fluids, methylphenyl fluids, copolymers of dimethylsiloxane and phenylmethyl or diphenylsiloxane units.

As mentioned heretofore, a sufficient amount of filler should be employed in the dough-like silicone composition to provide a 5 minute Williams plasticity value of from about 60 to about 140. Likewise, in the flowable silicone composition, a sufficient amount of filler should be used to provide flowable compositions having a viscosity of from about 5,000 to about 80,000 cs., preferably from 10,000 to 40,000 cs. and more preferably from 20,000 to 30,000 cs. at 25°C. Obviously the amount of filler employed in the flowable silicone composition may be varied within wide limits for example, from about 10 to about 300 percent by weight of filler, based on the weight of the organopolysiloxane polymer. The exact amount of filler used will depend upon such factors as, for instance, the type of filler employed (i.e., density of the filler) and the viscosity of the organopolysiloxane polymer.

Fillers may be employed in the silicone compositions of this invention are well known in the art. Examples of suitable fillers are the various natural and manufactured silicas, carbon blacks, quartz flour, asbestos flour, mica flour, zinc oxide, zirconium silicate, silica aerogel, iron oxide, diatomaceous earth, calcium carbonate, fumed silica, precipated silica, titanium dioxide and the like.

Generally the organopolysiloxane polymer is mixed with the curing agent which consists of a cross-linking agent and a condensation catalyst, after the filler has been added. However, the curing agent may be combined with the filler and thereafter mixed with the organopolysiloxane polymer.

Components which serve as cross-linking agents are generally polyfunctional organosilicon compounds containing more than two functional groups. Examples of suitable cross-linking agents are polyalkoxysilanes of the formula $(R''O)_x Si(R''')_{4-x}$ or polyalkoxysiloxanes in which the silicon atoms are linked through Si-O-Si linkages and the remaining valences of the silicon atom are satisfied by R''O and/or R''' groups.

In the above formula, groups represented by R'' are monovalent hydrocarbon radicals having up to 8 carbon atoms, while those represented by R''' are monovalent hydrocarbon radicals or halogenated monovalent hydrocarbon radicals having up to 8 carbon atoms. Likewise, R'' may also represent R''''OR'' groups in which R'''' is a divalent hydrocarbon radical having up to 6 carbon atoms, R'' is the same as above and x has a value of 3 or 4. Examples of monovalent hydrocarbon radicals represented by R'' are methyl, ethyl, propyl, butyl, hexyl, octyl, phenyl, vinyl, ally, ethylallyl, butadienyl and the like. Radicals represented by R''' may be the same as the radicals represented by R'' above as well as the corresponding halogenated groups such as cloromethyl, 2-bromo-4, 6-diiodophenyl, 1,2-difluorovinyl, 3,4-difluorocyclopentyl, 2-bromocyclopentene-2,3-yl and 6-chlorohexyl. Radicals represented by R'''' are divalent hydrocarbon radicals such as ethylene, trimethylene, tetramethylene, pentamethylene, hexamethylene and phenylene. The polyalkoxysilanes employed herein include mono-organotrihydrocarbonoxy silanes, tetra(beta-methoxymethoxy)silane, tetra(beta-methoxymethoxy)silane, methyl tri(-beta-methoxyethoxy)silane, tetrahydrocarbonoxy silanes, e.g. orthosilicates and partial hydrolyzates of such silanes. The polyalkoxy compounds, e.g. ethyl orthosilicate or partial hydrolyzed ethyl silicate such as ethyl silicate "40" which consists primarily of decaethyl tetrasilicate are representative of these compounds. Examples of other operative alkyl silicates are ethyltrimethoxysilane, methylbutoxydiethoxysilane, propyltripropoxysilane, methyltriethoxysilane, ethyltriethoxysilane, and n-butyl orthosilicate. Examples of alkylpolysilicates are ethylpolysilicate, isopropylpolysilicate and butylpolysilicate, dimethyltetraethoxydisiloxane, trimethylpentabutoxytrisiloxane and the like.

Other cross-linking agents which may be employed are organohydrogenpolysiloxanes of the general formula $R_y HSiO_{3-y/2}$ wherein R is the same as above and y is a number greater than 0 but less than 2 and mixtures of these organohydrogenpolysiloxanes with polyalkoxysilanes or polyalkoxysiloxanes.

These organohydrogen polysiloxanes may be further represented by the general formula

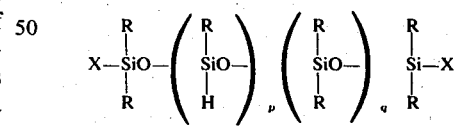

in which R is the same as above, X may be R'', OH or OR'', p is a number equal to at least 10 and may be number less than, equal to or greater than p. Generally the ratio of p to q is in the range of from about 1:0 to 1:5.

The cross-linking agents employed herein may be used either alone or in combination and should be used in a proportion of from about 0.5 to about 10 percent, preferably from about 1 to 5 percent by weight based on the weight of the organopolysiloxane polymer. If the total weight of, for example, the polyalkoxysilanes or polyalkoxysiloxanes is below about 0.5 percent based on the weight of the organopolysiloxane polymer, very little cross-linking occurs. If, on the other hand, the total weight of the polyalkoxysilanes or polyalkoxysiloxanes is above about 10 percent based on the weight of the organopolysiloxane polymer, the curing time will not be substantially reduced. However, a large excess of cross-linking agent insures complete reaction with all silicon bonded hydroxyl groups and in addition, acts as a scavenger for any moisture which may be present.

Catalysts which may be employed in this invention include organic and inorganic acids and bases, metal salts of organic acids, metal chelates and organometallic compounds. Specific operable catalysts include stearic acid, trifluoroacetic acid, dibutylamine, tetramethylammonium hydroxide, piperidine, lead octoate, tin ricinoleate, cobalt hexoate, zirconium acetoacetate, dibutyltin dilaureate, dioctyltin dimaleinate and other dialkyltin diacylates in which the acyl group contains from 2 to 18 carbon atoms. Other tin compounds which may be employed are dibutyltin butoxy chloride, trimethyltin hydroxide, dimethylchlorotin hydroxide, dimethoxydiphenyltin, triethyltin hydroxide and stannoxanes such as 1,1,3,3-tetramethyl-1,3 diacetoxydistannoxane, 1,1,3,3-tetrabutyl-1,3-dilauroyloxydistannoxane and the like.

The catalysts used herein are effective in minimal amounts, e.g., from about 0.01 to about 10 percent, preferably from about 0.05 to about 5 percent and more preferably from about 0.1 to 3 percent by weight based on the weight of the organopolysiloxane polymer. A mixture of two or more of these catalysts may be used, if desired.

The flow properties of the flowable silicone composition may be substantially improved by the addition of certain chemical compounds which contain both polar and nonpolar moieties. The polar moiety contains one or more groups which have an affinity for the inorganic fillers. It is believed that these compounds interact with the surface of the fillers to displace the organopolysiloxanes, thereby reducing the thickening action or structure build up which normally occurs when fillers interact with the organopolysiloxanes.

In general, nonionic compounds are preferred over ionic compounds because they are more easily dispersed in the organopolysiloxane. However, certain ionic compounds, such as long-chain organic acids, may be used in the practice of this invention. Suitable salts include sodium, potassium, ammonium and substituted ammonium salts of carboxylic, sulfonic, sulfuric, phosphonic and phosphoric acids containing at least 14 carbon atoms. Examples include sodium nonylbenzenesulfonate, sodium lauryl sulfate, triethanolammonium oleate, sodium dihexyl sulfosuccinate and sodium capryl metaphosphate.

Preferred nonionic compounds generally include as the moiety a polyoxyalkylene chain alone or in combination with one or more hydroxyl groups. This chain may be represented by the formula

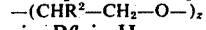

wherein $R^a$ is H, or a lower alkyl group, preferably methyl and z is an integer of from 2 to 50, preferably from 4 to 20.

The nonpolar moiety which consists of a paraffinic, monoolefinic chain, should have of at least 9 carbon atoms and the siloxane chain should contain of at least 9 units of the structure -Si (CH$_3$($_2$O—. The polar and nonpolar moieties may be joined directly or through other atoms or groups by covalent bonds. The joining atoms or groups may be oxygen, methylene, carbonyl, arylene, carboxylate, phosphate or other bivalent or tervalent organic or inorganic radicals. Generally, each molecule contains one polar and one nonpolar group; however, in some cases two or more of each type may be present.

Examples of suitable compounds which may be employed as additives in this invention are monoalkyl and alkaryl ethers of polyalkylene glycols. These have the general formula

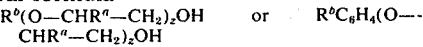

in which $R^b$ is an alkyl radical of from 4 to 22 carbon atoms and $R^a$ is hydrogen, or a lower alkyl and z is the same as above. If all of the $R^a$ groups are hydrogen, $R^b$ should have at least 9 carbon atoms. Examples include polyoxyethylenepolyoxypropylene monobutyl ether, polyoxyethylene (4) lauryl ether, polyoxyethylene (10) cetyl ether, polyoxyethylene (20) oleyl ether, polyoxyethylene (10) nonylphenyl ether and the like.

Other compounds which may be employed are esters of polyalkylene glycols of the formula

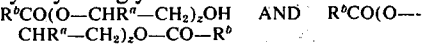

in which $R^a$, $R^b$ and z are the same as above. Examples include polyoxyethylene mono- and dilaurate, mono- and distearate, mono- and dioleate, polyoxypropylene mono- and dilaurate and the like.

Also polyol derivatives which include poly (ethylene oxide) derivatives of mono- and diglycerides, poly (ethylene oxide) derivatives of sorbitan, methyl glucoside, pentaerythritol and other polyols partially esterified with long-chain fatty acids, e.g., polyoxyethylene sorbitan monooleate and the like may be used as viscosity reducing agents.

Other compounds which may be employed are phosphonates, which include polyalkylene glycol esters of long-chain alkanephosphonic acids, such as the bis-tetraethylene glycol ester of octadecanephosphonic acid and the like.

Polyether-siloxanes which include both hydrolyzable types in which the polyether is bonded to silicon through a silicon-oxygen bond and nonhydrolyzable types, in which the polyether is bonded through a carbon atom may be used as viscosity reducing agents. An example of the latter is the following compound

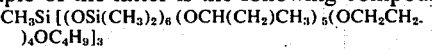

Generally the amount of additive used to improve the flow characteristics of these compositions is not critical; however, a sufficient amount may be incorporated therein to reduce the viscosity of the catalyzed and filled organopolysiloxane composition so that it will flow into the confined spaces of the mold box within from about 5 to 30 minutes. Generally the viscosity of the catalyzed flowable silicone composition ranges from about 10,000 to about 50,000 cs., preferably from about 15,000 to 30,000 and more preferably from about 20,000 to 25,000 at 25°C. Obviously the amount of additive is determined in part by the viscosity of the hydroxyl-terminated organopolysiloxane polymer and the amount of filler added. In general from about 0.05 to about 5 percent by weight and more preferably from about 0.2 to about 2 percent by weight based on the weight of the composition may be added in order to provide the desired flow characteristics. If the amount of additive exceeds about 5 percent by weight, the physical properties such as elongation, tear strength and durometer may be substantially altered.

Other additives such as pigments, antioxidants, flame retardants, ultraviolet absorbents and the like may be included in the compositions of this invention.

The dough-like silicone compositions of this invention may be prepared by mixing the various ingredients together in any desired order. Generally, it is preferred that the filler be admixed with the hydroxyl-terminated organopolysiloxane. Just prior to use, a mixture containing a cross-linking agent, catalyst and other additives, if desired, is then mixed with the organopolysiloxane-filler mixture.

In preparing the flowable silicone compositions, the various ingredients may be admixed in any desired order; however, it is preferred that the hydroxyl-terminated organopolysiloxane be admixed with the filler and cross-linking agent and just prior to use, the catalyst is then added. The catalyst and cross-linking agent may be combined and added to the organopolysiloxane filler mixture just prior to use. In preparing the dough-like silicone compositions and the flowable silicone compositions, it is preferred that the catalyst be added last because vulcanization starts within a matter of minutes and cure will begin within 1 to 2 hours at room temperature. It is, however, important that the dough-like silicone composition and the flowable silicone composition used in the mold be compatible, i.e., both the dough-like silicone composition and the flowable silicone composition should employ substantially the same cross-linking agent and curing catalyst.

In preparing the silicone molds of this invention, a pattern is positioned in a mold box and the dough-like silicone polymer composition is pressed onto the patterns, preferably in areas subjected to high stress. The flowable silicone polymer composition is then poured into the mold cavity to fill the mold box. A top plate is usually placed on the mold box and weight applied to force out the air and to force the flowable silicone composition into all areas of the mold box. The silicone mold is cured in ambient moisture and temperature and then demolded. The demolded silicone mold may be used immediately in a high frequency flow molding operation.

Often times it is preferred that reinforcing materials be included in these silicone molds to impart mechanical strength, increase their resistance to tearing and impart dimensional stability. Suitable examples of reinforcing materials are inorganic fabrics such as metal cloth, asbestos and glass cloth as well as natural or synthetic organic fabrics such as cotton, wool, nylon, nomex and dacron.

Often times when the reinforcing material is used in the silicone molds, it is preferred that the material be first treated with a primer to increase the adhesion between the reinforcing material and the silicone composition.

When using a reinforcing material it is preferred that the reinforcing material be placed directly on the dough-like silicone composition and the flowable silicone composition is then poured directly over the reinforcing material. The dough-like silicone composition supports the reinforcing material midway between the lower surface and the upper surface of the resulting mold. The resulting silicone mold exhibits improved mechanical strength, improved resistance to tear and improved dimensional stability.

Surprisingly, it was found that the dough-like material not only imparts strength to the final mold, but also protects the pattern against damage from the liquid silicone rubber which tends to deface the pattern by filling in the interstices of the pattern and in some cases tearing the pattern during subsequent demolding.

The silicone molds of this invention are particularly suited for preparing synthetic plastic materials which simulate the appearance of natural fabrics and textured surfaces. These molds are especially useful in high frequency flow molding of thermoplastics such as polyvinyl chloride.

The embodiments of this invention are further illustrated by the following examples in which all parts are by weight unless otherwise specified.

EXAMPLE 1

A dough-like silicone composition is prepared by mixing about 30 parts of a hydroxyl-terminated dimethylpolysiloxane having a 30 second Williams plasticity value greater than 140 with about 21 parts of diatomaceous earth on a two roll mill. About 2 parts of a hydroxyl-terminated dimethylpolysiloxane having a viscosity of about 20,000 cs. at 25°C. are then added to the mixture and milled.

About 0.3 part of a mixture containing 50 percent by weight of dibutyltin dilaurate and 50 percent by weight based on the weight of the mixture of ethyl silicate "40" is mixed with the above dimethylpolysiloxane-filler mixture and then applied to the perforations (perfs), pinking and stitching of a leather pattern positioned horizontally in a mold box.

A ¼ inch square hardware cloth is placed on top of the dough-like silicone composition and then a flowable silicone composition is added to the mold box assembly to fill the mold cavity and cover the hardware cloth.

The flowable silicone composition is prepared by mixing about 100 parts of a hydroxyl-terminated dimethylpolysiloxane with about 5 parts of ethyl silicate "40", about 65 parts of quartz flour (5u), about 33 parts of diatomaceous earth, about 3 parts of dibutyltin dilaurate and about 8 parts of titanium dioxide.

The silicone mold is cured for about 16 hours at room temperature and then separated from the mold assembly. The silicone mold may be used immediately.

EXAMPLE 2

A dough-like silicone composition is prepared by mixing about 30 parts of a hydroxyl-terminated dimethylpolysiloxane having a 30 second Williams plasticity value greater than 140 with about 21 parts of diatomaceous earth on a two roll mill. About 2 parts of a hydroxyl-terminated dimethylpolysiloxane having a viscosity of about 20,000 cs. at 25°C. and 0.15 part of a mixture of cross-linking agents consisting of a trimethylsiloxy endblocked methylhydrogenpolysiloxane fluid having a viscosity of from 20 to 40 cs. at 25°C. (SWS-470), phenyltriethoxysilane and diphenyldiethoxysilane in a weight ratio of 2:0.1:0.1 are then added to the mixture and milled.

About 0.15 part of dibutyltin dilaurate is mixed with the above dimethylpolysiloxane-filler mixture and then applied to the perforations, pinking and stitching of a leather pattern positioned horizontally in a mold box.

A flowable silicone composition is prepared by mixing about 100 parts of a hydroxyl-terminated dimethylpolysiloxane with about 5 parts of a mixture of cross-linking agents consisting of a trimethylsiloxy endblocked methylhydrogenpolysiloxane fluid having a viscosity of from 20 to 40 cs. at 25°C. (SWS-470) diphenyldiethoxysilane and phenyltriethoxysilane in a weight ratio of 2:0.1:0.1, about 65 parts of quartz flour (5u) about 33 parts of diatomaceous earth, about 3 parts of dibutyltin dilaurate and about 8 parts of titanium dioxide and then added to the mold box assembly. A sufficient amount of the flowable composition is added to fill the mold cavity and cover the dough-like material. The silicone mold is cured for about 24 hours at room temperature and then separated from the mold assembly. The silicone mold may be used immediately.

EXAMPLE 3

The procedure of Example 2 is repeated except that 0.2 part of butoxypolyoxyethylene polyoxypropylene glycol ("Ucon" 50-HB-260-X, available from Union Carbide Corporation) is added to the flowable silicone composition. The molding surface of the silicone mold is substantially an exact negative of the surface of the leather pattern being copied.

Although specific examples of the invention have been described above, it is not intended to limit the invention solely therto, but to include variations and modifications falling within the spirit and scope of the appended claims.

What is claimed is:

1. A method for preparing a silicone mold having dimensional stability which comprises (1) applying to that portion of a stationary pattern which is vulnerable to high stress a room temperature curable silicone composition (a) having a 5 minute Williams plasticity value of from 60 to 140, said silicone composition (a) is prepared by forming a mixture containing a hydroxyl-terminated organopolysiloxane having a 30 second Williams plasticity value above about 100, sufficient filler to provide a 5 minute Williams plasticity value of from 60 to 140, a cross-linking agent and a catalyst capable of curing the silicone composition to an elastomeric solid at room temperature, (2) applying a room temperature curable silicone composition (b) which is compatible with silicone composition (a) and has a viscosity of from 5,000 to 80,000 cs. at 25°C. to the remainder of the pattern, said silicone composition (b) is prepared by forming a mixture containing a hydroxyl-terminated organoplysiloxane having a viscosity of from 100 to 40,000 cs. at 25°C., sufficient filler to provide a viscosity of from 5,000 to 80,000 cs. at 25°C., a cross-linking agent and a catalyst capable of curing the silicone composition to an elastomeric solid at room temperature, (3) curing the silicone compositions at ambient temperature and thereafter (4) removing the silicone mold from the pattern.

2. The method of claim 1 wherein the silicone composition (a) has a 5 minute Williams plasticity value of from 90 to 110.

3. The method of claim 1 wherein the silicone composition (b) contains from 0.1 to 5.0 percent by weight based on the weight of composition (b) of an additive which reduces the viscosity of composition (b), said additive containing both polar and nonpolar moieties.

4. The method of claim 1 wherein the cross-linking agent is selected from the group consisting of polyalkoxysilanes, polyalkoxysiloxanes and organohydrogenpolysiloxanes.

5. The method of claim 4 wherein the cross-linking agent is a polyalkoxysiloxane.

6. The method of claim 1 wherein the catalyst is a dialkyltin diacylate in which the acyl group has from 2 to 18 carbon atoms.

7. The method of claim 5 wherein the cross-linking agent is a mixture of an organohydrogenpolysiloxane and a polyalkoxysiloxane.

8. The method of claim 1 wherein said silicone composition (a) is applied to a portion of a stationary pattern, a reinforcing material is applied over said silicone composition (a) and thereafter silicone composition (b) is applied to the remainder of the pattern to form a mold in which the reinforcing material is imbedded between the two surfaces of the silicone mold.

9. The method of claim 8 wherein the reinforcing material is a glass cloth.

10. The method of claim 8 wherein the reinforcing material is a metal screen.

11. The method of claim 8 wherein the reinforcing material is a synthetic textile.

* * * * *